(12) United States Patent
Watanabe et al.

(10) Patent No.: US 7,227,520 B2
(45) Date of Patent: Jun. 5, 2007

(54) DISPLAY DEVICE HAVING LUMINANCE CORRECTING FUNCTION

(75) Inventors: Toshimitsu Watanabe, Yokohama (JP); Mitsuo Nakajima, Yokohama (JP); Nobuaki Kabuto, Kunitachi (JP); Mutsumi Suzuki, Kodaira (JP); Yoshihisa Ooishi, Yokohama (JP); Junichi Ikoma, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 637 days.

(21) Appl. No.: 10/700,967

(22) Filed: Oct. 31, 2003

(65) Prior Publication Data
US 2004/0252083 A1 Dec. 16, 2004

(30) Foreign Application Priority Data
Jun. 16, 2003 (JP) ............................. 2003-170186

(51) Int. Cl.
*G09G 3/30* (2006.01)
(52) U.S. Cl. ......................................... 345/77; 345/84
(58) Field of Classification Search ................. 345/75, 345/76, 77, 78, 36, 48, 84
See application file for complete search history.

(56) References Cited

U.S. PATENT DOCUMENTS

| | | | |
|---|---|---|---|
| 5,262,698 A | 11/1993 | Dunham | |
| 5,473,373 A | 12/1995 | Hwung et al. | |
| 5,734,223 A * | 3/1998 | Makishima et al. | 313/495 |
| 6,433,838 B1 | 8/2002 | Chen | |
| 6,545,652 B1 * | 4/2003 | Tsuji | 345/82 |
| 6,791,566 B1 * | 9/2004 | Kuratomi et al. | 345/589 |
| 2003/0107682 A1 | 6/2003 | Sono | |

FOREIGN PATENT DOCUMENTS

| | | |
|---|---|---|
| EP | 0953958 A2 | 11/1999 |
| JP | 01-206775 A | 8/1989 |
| JP | A-7-181911 | 7/1995 |
| JP | 10-271409 A | 10/1998 |
| JP | 1999-288248 | 10/1999 |
| JP | 2000-242217 | 9/2000 |
| JP | 2000-310970 | 11/2000 |
| JP | 2000-338922 A | 12/2000 |
| JP | A-2001-350442 | 12/2001 |
| JP | A-2002-313262 | 10/2002 |
| KR | 10-0285622 | 1/2000 |

* cited by examiner

*Primary Examiner*—Richard Hjerpe
*Assistant Examiner*—Jean Lesperance
(74) *Attorney, Agent, or Firm*—Townsend and Townsend and Crew LLP (57) ABSTRACT

To improve luminance uniformity in a panel plane, for example, there is set an amplitude of a pixel driving voltage which is an anode current in the neighborhood of a threshold value of electron emission of one pixel and the amplitude is kept as a threshold value correction value for each pixel, and to correct the luminance variation in the high-luminance emission between the pixels, there is set an amplitude of a pixel driving voltage which is an anode current in the neighborhood of a maximum value of electron emission of one pixel and the amplitude is kept as a gain correction value for each pixel. In the configuration, when a video image is displayed, the input video signal is corrected using the threshold correction value and the gain correction value for each pixel.

13 Claims, 5 Drawing Sheets

DISPLAY DEVICE HAVING LUMINANCE CORRECTING FUNCTION

CROSS-REFERENCE TO RELATED APPLICAITON

This invention relates to a patent application Ser. No. 10/684,062 entitled "A DISPLAY DEVICE HAVING A CIRCUIT PROTECTION FUNCTION" filed by Watanabe et al. on Oct. 10, 2003 claiming foreign priority under 35 U.S.C. Section 119 of Japanese Patent Application No. 2003-170182.

BACKGROUND OF THE INVENTION

The present invention relates to a luminance correction technique in a display device using, for example, a field emission display (FED).

JP-A-7-181911 describes a method of luminance correction between pixels constituting a field emission display (reference is to be made to, for example, page 15 and FIG. 1). The display is driven, for example, in a pixel-by-pixel way to detect as an anode current a quantity of electrons emitted from each pixel, an amplitude or a pulse width of a driving voltage applied to each pixel is controlled to obtain an appropriate electron emission quantity, and the value is kept and outputted as a correction value of each pixel. JP-A-2001-350442 describes a technique in which an anode current is similarly measured to create a luminance correction memory (reference is to be made to, for example, pages 8 and 9 and FIG. 1).

JP-A-2002-313262 describes a method in which since the display elements are configured in a form of a matrix, to avoid increase in a period of time to measure the correction quantity for the luminance correction values, a panel including subdivided anode electrodes is used to simultaneously obtain luminance correction values of a plurality of pixels to thereby reduce the measuring period of time (reference is to be made to, for example, page 5 and FIG. 1).

SUMMARY OF THE INVENTION

A field emission display is a flat display device including a plurality of light sources arranged in a form of a matrix in which electron beams drawn from selected pixels excite phosphor arranged in a form of a matrix for light emission to thereby display a video image. To draw electron beams, there can be used methods to configure electron sources such as a method using carbon nanotubes (CNT), a method using a surface conduction emission elements (SCE), a balistic surface electron emitting device (BSD) and a method using metal-insulator-metal emission elements (MIM). For performance of each of the panels using these elements, it is known that a considerable problem exists in uniformity of luminance between pixels because of non-uniformity of electron emitting elements in a plane depending on the manufacturing process of the panels.

On the other hand, in a case of a display device using a hot cathode represented by a Braun tube, luminance at a low luminance level and luminance at a high luminance level are kept at design values by conducting two adjustments, namely, cutoff adjustment to adjust a threshold value for electron emission and drive adjustment to adjust an electron emission quantity for a large current.

However, the known technique described above is a method of conducting correction using a threshold value or a predetermined current value (a predetermined electron emission quantity), and does not guarantee uniformity of luminance in the panel plane for both of the low luminance and the high luminance.

From a viewpoint of luminance uniformity, it is required to consider two items, namely, luminance uniformity at a low luminance level and luminance uniformity at a high luminance level.

It is therefore a first object of the present invention to improve picture quality of a display device.

The method which uses the known technique described in JP-A-2002-313262 to measure the correction value in a short period of time requires two anode terminals in the panel and two high-voltage power sources to be connected to the anodes. This consequently leads to a new problem of increase in the cost.

Therefore, a second object of the present invention is to reduce the period of time to measure the correction quantity of the luminance correction value.

To achieve the first object of the present invention, there is provided a configuration according to a scope of the claims in which, for example, to correct the luminance variation in the low-luminance emission between the pixels, there is set an amplitude of a pixel driving voltage which is an anode current in the neighborhood of a threshold value of electron emission of one pixel and the amplitude is kept as a threshold value correction value of each pixel. To correct the luminance variation in the high-luminance emission between the pixels, there is set an amplitude of a pixel driving voltage which is an anode current in the neighborhood of a maximum value of electron emission of one pixel and the amplitude is kept as a gain correction value of each pixel. In this case, the low luminance is about 1 cd/m$^2$ or less and is about a threshold value (a cutoff level) of the electron emission and is favorably about 0.1 cd/m$^2$ as in a display panel of Braun tube type. The correction in the low-luminance emission is equalization of the emission start voltage for each pixel and is hence not restricted by the above values if the characteristic only slightly varies in the low-luminance emission. The high luminance is in the neighborhood of the maximum value of electron emission and ranges from about 100 cd/m$^2$ to about 500 cd/m$^2$ and is luminance when the overall screen is displayed in white.

When a video image is displayed, the threshold correction value is added to or subtracted from an input video signal for each pixel and the gain correction value is used as a gain setting value of the input video signal to guarantee uniformity of luminance between the pixels in consideration of the low and high luminance to thereby obtain high picture quality in the display device.

To achieve the second object according to the present invention, there is provided a configuration according to a scope of the claims in which, for example, the threshold correction value for each pixel includes, when the input video signal includes, for example, eight bits, bits the number of which is less than eight, and the gain correction value includes also bits the number of which is less than eight to thereby reduce the period time required for the adjustment.

DESCRIPTION OF THE EMBODIMENTS

Figure 5:
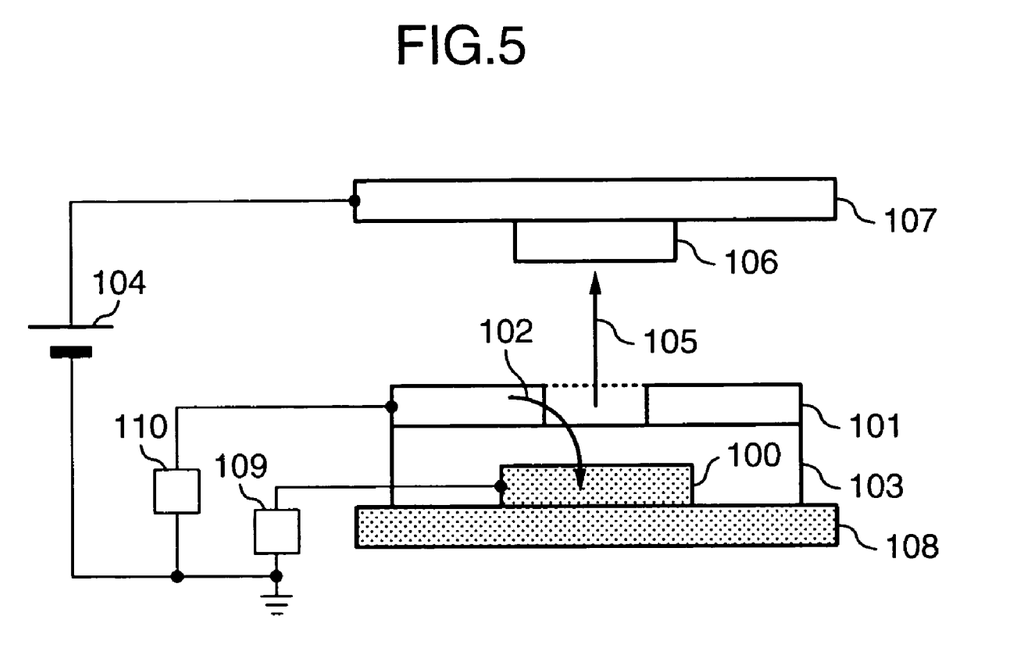
FIG. 5 is a diagram showing a configuration of an MIM-type FED.

FIG. 5 shows an MIM-type electron source to be applied to the device according to the present invention. When a voltage ranging from several volt to several tens of volt is applied between a scanning line 100 and a data line 101, a current of an arrow mark 102 flows through an insulator 103 in the MIM element. When the current 102 flows, there takes place a state in which electrons appear on a surface of the insulator 103, and at the same time, an electron beam 105 is obtained through an operation in which an electric field of a high-voltage power source 104 accelerates the electrons. The electron beams 105 excites phosphor 106 such that the phosphor 106 emits light through glass 107. Intensity of the light emission from the phosphor 106 is almost in proportion to a current density of the electron beam 105. Since the current density is in proportion to an MIM current 102, the MIM current 102 is high in high-luminance emission and is low in low-luminance emission.

Figure 1:
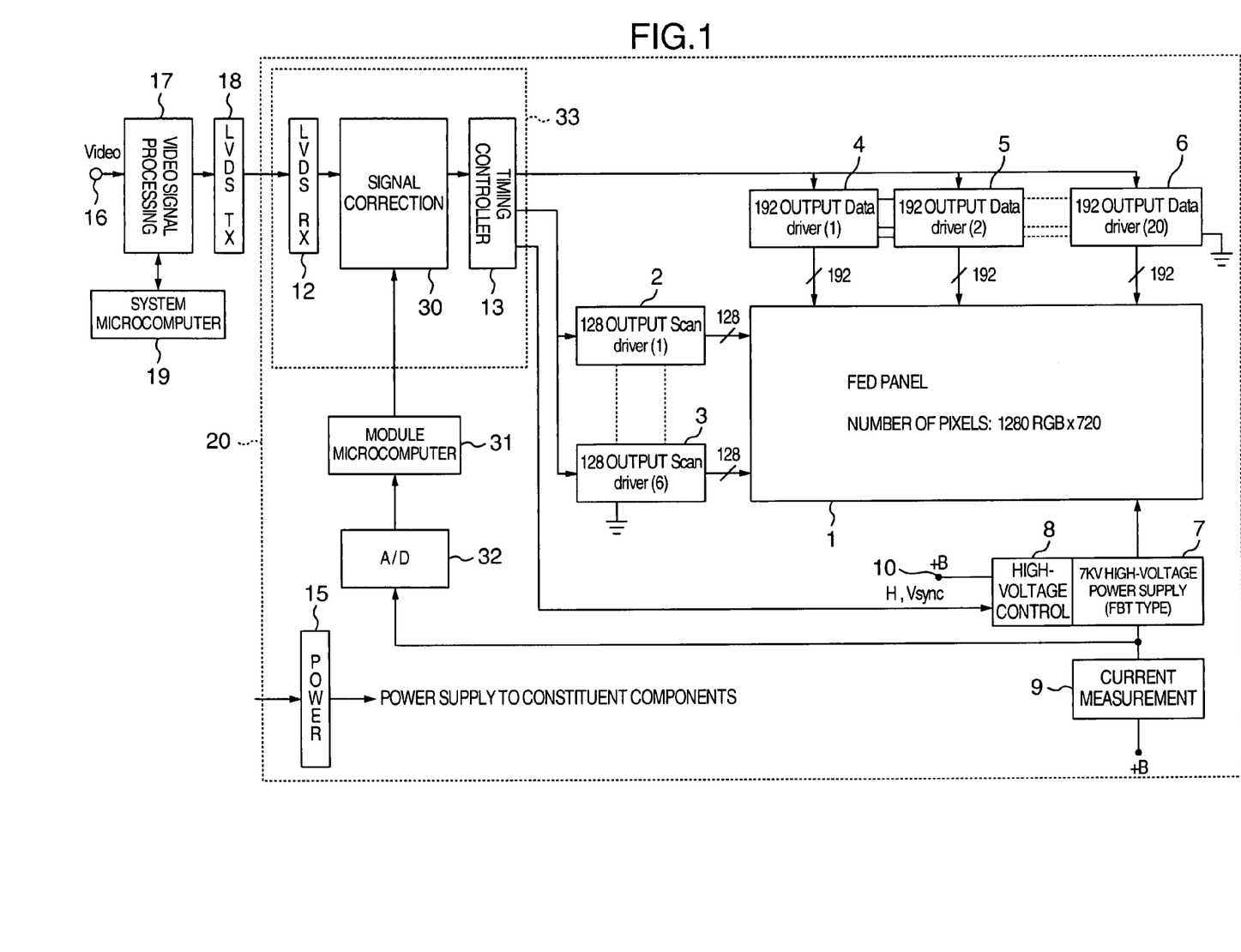
FIG. 1 is a block diagram showing a first embodiment of the present invention.

Next, description will be given of an embodiment of the present invention by referring to the drawings. FIG. 1 shows a first embodiment of a luminance correction unit in an FED according to the present invention.

An FED panel 1 is a video display device of passive matrix type and includes data lines and scan electrode lines. The scan electrode lines are connected to scan drivers 2 to 3, and the data lines are connected to data drivers 4, 5, and 6. FIG. 1 shows an example of an FED panel including 1280×3 horizontal pixels and 720 vertical pixels. In this case, when 192-output LSI are used as data drivers, 20 LSI are required, and when 128-output LSI are used as scan drivers, six LSI are required. The drivers are respectively indicated by circuit blocks 2 to 6 in FIG. 1. An anode terminal of the FED panel 1 is connected to a high-voltage power supply circuit 7, a high-voltage control circuit 8, and a current measuring circuit 9. A terminal 10 is a power source terminal. The scan drivers 2 to 3, the data drivers 4 to 6, the high-voltage power supply circuit 7, and the high-voltage control circuit 8 are connected via an LVDSRx (Low Voltage Differential Signaling) circuit 12, a signal correction circuit 30, and a timing control circuit 13 to each other. The high-voltage power supply circuit 7 and the high-voltage control circuit 8 supply a high voltage to the FED panel 1 and stabilize the voltage. The LVDSRx circuit 12 converts a low-voltage digital video differential signal into a TTL-level digital video signal. The signal correction circuit 30 corrects the digital video signal. The timing control circuit 13 transfers data to the scan drivers 2 to 3 and the data drivers 4 to 6 at predetermined timing. The current measuring circuit 9 detects a current value from the high-voltage power supply circuit 7 and the high-voltage control circuit 8 to the FED panel 1. An output from the current measuring circuit 9 is connected to and AD converter circuit 32 and the module microcomputer 31. The module microcomputer 31 is connected to the signal correction circuit 30. The module microcomputer 31 obtains a detected current detection value and conducts operation for the value therein to control the signal correction circuit 30. An inner section enclosed by a dotted-line frame 20 indicates an EFD module 20. A dotted-line frame 33 indicates a module signal processing block 33. A connector 15 is a power supply connector to supply power to the FED module 20. The FED module 20 is connected to a video signal input terminal 16, a video signal processing circuit 17, a system microcomputer 19, and an LVDSTx circuit 18 to configure a video display device. The video signal processing circuit 17 conducts adjustment of, for example, an amplitude, a black level, and hue for a video signal inputted from the video signal terminal 16 according to the system microcomputer 19. The system microcomputer 19 stores setting data to control the amplitude, the black level, and the hue in the video signal processing circuit 17 and controls the amplitude, the black level, and the hue. The LVDSTx circuit 18 converts a digital video signal at a TTL level into a low-voltage digital differential voltage signal.

When a video signal is inputted from the video signal terminal 16, the video signal processing circuit 17 conducts adjustment of, for example, an amplitude, a black level, and hue for the video signal and sends the signal via the LVDSTx circuit 18 to the LVDSRx circuit 12 of the FED module 20. The video signal processing circuit 17 adjusts, for example, an amplitude, a black level, and hue of the video signal using the setting data stored in the system microcomputer 19 to control the amplitude, the black level, and the hue. A video signal inputted to the LVDSRx circuit 12 is sent via the signal correction circuit 30 to the timing controller 13 to send signals and data respectively to the scan drivers 2 to 3, the data drivers 4 to 6, and the high-voltage control circuit 8 at respectively optimal timing. The data drivers 4 to 6 keep one-line data of the FED panel 1 for one horizontal period to write new data at an interval of one horizontal period. The scan drivers 2 to 3 sequentially select scanning electrode lines of the FED panel 1 in a vertical direction. For example, there is used a method in which a 0-volt voltage is applied thereto at selection and a 5-volt voltage is applied thereto at non-selection. When the scanning electrodes are selected, since a voltage of several kilovolt is applied from the high-voltage power supply circuit 7 to the anode terminal of the FED panel 1 according to output data from the data drivers 4 to 6, electron emission is conducted for each pixel and phosphor emits light by electron excitation to display one horizontal line of video. When the scan drivers 2 to 3 sequentially select the scanning electrode lines, one frame of video is displayed.

When a video image displayed on the FED panel 1 is bright, the quantity of a load current from the high-voltage power supply circuit 7 is large. When the video image displayed on the FED panel 1 is dark, the quantity of a load current from the high-voltage power supply circuit 7 is small. The voltage value of the high-voltage power supply circuit 7 decreases as the load current increases. The high-voltage control circuit 8 conducts a control operation for high-voltage stabilization to keep the high-voltage value at a fixed value.

The current measuring circuit 9 converts the detected anode current value from the high-voltage power supply circuit 7 into a voltage value and outputs the voltage value therefrom. The output is converted by the AD converter 32 into a digital value to be fed as data in the module microcomputer 31.

Figure 2:
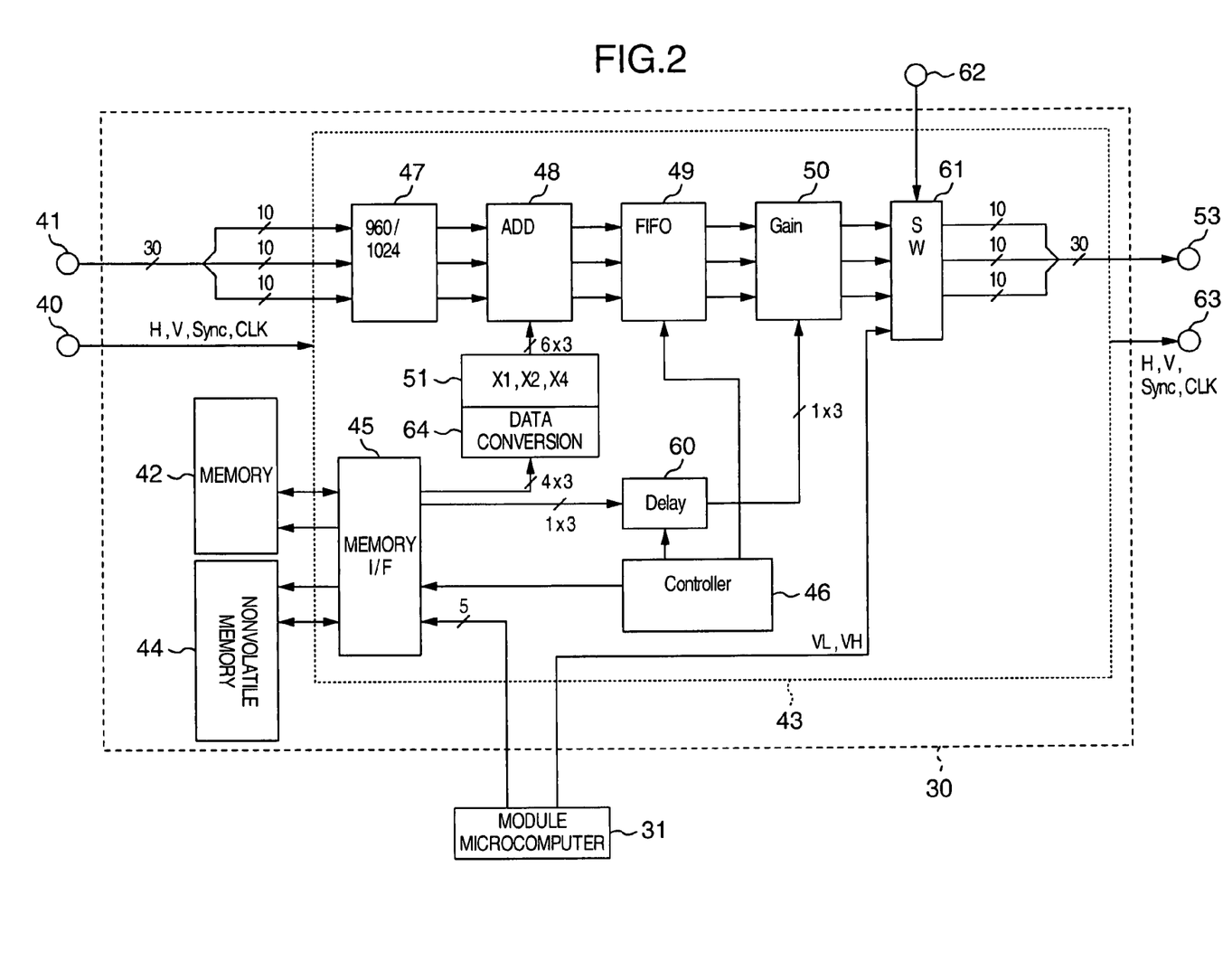
FIG. 2 is a block diagram showing a specific configuration of a constituent component 30 of the first embodiment.

The signal processing circuit 30 has two operation modes, namely, an adjustment mode (first mode) and a video display mode (second mode). The respective modes will be described by referring to FIG. 2. FIG. 2 shows an specific example of constitution of the signal processing circuit 30. Numeral 41 is a video input terminal, numeral 53 is a video output terminal of a video signal after correction, a numeral 40 is an input terminal for signals such as a video synchronizing signal, numeral 63 is an output terminal of signals such as a video synchronizing signal, numeral 61 is a switch circuit, and numeral 62 is a change-over control terminal for change-over between the adjustment mode and the video display mode. It is assumed that the components of the same reference numerals as those of FIG. 1 have the same functions. The signal processing circuit 30 has one input and one output in FIG. 1. Actually, two terminals, namely, the video terminals and the video synchronizing signal terminals are disposed for the input and the output, respectively.

Description will now be given of the first mode, namely, the adjustment mode. In the adjustment mode, the module microcomputer 31 horizontally and vertically scans the pixels of the FED panel 1 via the switch circuit 61 in the signal correction circuit 30 in a sequential way to output a signal voltage (VL) of an amplitude for low luminance and a signal voltage (VH) of an amplitude for high luminance. Simultaneously, the module microcomputer 31 outputs synchronizing signals to horizontally and vertically scan the pixels in a sequential way.

For a predetermined pixel, when the signal voltage (VL) of an amplitude for low luminance is applied, an anode current (IL) flows from the high-voltage power supply circuit 7 to the FED panel 1 and is converted by the current measuring circuit 9 into a voltage (Vth). Vth is converted by the AD converter 32 into a digital value (Vthd). The module microcomputer 31 compares Vthd with a reference voltage Vs1 beforehand stored therein to obtain a differential value (Vc) of Vthd−Vs1 through operation and temporarily stores the value therein. In the description, Vthd and Vc are, for example, 4-bit digital data items. Vs1 can be freely set to the module microcomputer 31. Vc obtained through the above operation has a large value when the flowing current is large, that is, when the luminance is high.

After the storing operation is finished, the signal voltage (VH) of an amplitude for high luminance is outputted. When an anode current (IH) flows, the current is converted by the current measuring circuit 9 into a voltage (Vpk). Vpk is converted by the AD converter circuit 32 into a digital value (Vpkd). The module microcomputer 31 compares Vpkd with a reference voltage Vs2 beforehand stored therein to obtain a differential value (Vp) of Vpkd−Vs2 through operation and obtains 1-bit data of "1" if the differential value is positive and 1-bit data of "0" if the differential value is negative. It is assumed that Vp described above is freely set to the module microcomputer 31. Vp obtained as above and Vc (4-bit data) described above are fed as 5-bit data via the memory interface circuit 45 to the nonvolatile memory 44. For example, in a case in which a flash memory with a data input bit width of 16 bits is used as the nonvolatile memory 44, after the 5-bit data is fed to the module microcomputer 31 three times, the data is written as 15-bit data in the flash memory. In this case, it is natural that control is easy when three RGB data items are collected into one data item to be stored at an associated address in the memory. Many methods are available to write the data in the nonvolatile memory 44, and the method above is only an example. The above operation is conducted for all pixels of the FED panel 1 through the sequential scanning operation, and then the adjustment mode is finished.

Next, the second mode, namely, the video display mode will be described. When the mode is changed from the first mode to the second mode, the Vc and Vp data items stored in the nonvolatile memory 44 in the first mode are written via the memory interface circuit 45 in a memory 42. In this case, for example, an SDRAM (Synchronous Dynamic Random Access Memory) capable of conducting a high-speed operation corresponding to the pixel drawing speed of the FED panel 1 is used as the memory 42. The nonvolatile memory 44 and the memory 45 operate under control of the controller 46. In other than the mode change-over, the write operation is also conducted when the state is changed from the power-off state to the power-on state.

Next, a synchronizing signal synchronized with a video signal and a clock signal are inputted from the terminals 40 and 41. At timing synchronized with the signals, 16-bit data is read from the memory 42. The memory interface circuit 45 subdivides the readout 16-bit data into 12-bit Vc data (4-bit data items for R, G, and B sub-pixels) and 3-bit Vp data (1-bit data items for R, G, and B sub-pixels) and outputs the data items. The outputted 12-bit Vc data is converted by the data converting circuit 64 and is then fed to a magnification factor setting circuit 51. The data converting circuit 64 converts the Vc data, for example, through 16−Vc. In this case, since 4-bit correction data is assigned to each pixel, "16" (16 in 16−Vc) is used. According to the operation in this section, a small value is outputted when Vc is large (the associated pixel has high luminance when VL is applied). The magnification factor setting circuit 51 converts the input data using the magnification factor freely set thereto and outputs the result to the adding circuit 48.

On the other hand, the R, G, B 10-bit data items inputted from the video input signal terminal 41 are sent to a data compressing circuit 47 and are then fed to the adding circuit 48. For example, when the input video data is ten bits, Vc is four bits, and the magnification factor setting value is four, the correction value is at most 16 (=16−Vc (the maximum value is obtained when Vc=0))×4 (magnification factor setting value)=64. Since the input video data is ten bits and hence is 1024, the video data is compressed through an operation of 960/1024 and the result is added to a correction value of 64 obtained by the magnification factor correction, namely, 1024×(960/1024)+64=1024. The value is set not to be beyond the condition of saturation for the maximum value or not to exceed 1024 (ten bits) of the input video data. The magnification factor setting in the magnification factor setting circuit 51 can cope with input signals of various numbers of bits in a configuration in which, for example, the magnification factor can be changed to one for an 8-bit input, two for a 9-bit input, and four for a 10-bit input.

The low-luminance correction is conducted for each pixel as above. That is, the adding value is small for a video signal corresponding to a pixel of which the luminance is high when VL is applied. Conversely, the adding value is large for a video signal corresponding to a pixel of which the luminance is low when VL is applied to thereby suppress variation in luminance of the pixels in the low-luminance operation. Since the data compression is conducted, the addition of the correction value does not lead to the saturation to exceed the predetermined value.

The video signal after the correction is stored in a memory circuit 49. The video signals stored in the memory circuit 49 are sequentially read therefrom and then pass a gain change-over circuit 50 to correct the high-level luminance. The gain change-over circuit 50 conducts a gain change-over in two stages for each pixel according to the 1-bit data Vp set for each of the R, G, and B pixels. That is, the gain change-over is a two-stage change-over to conduct a change-over of setting data according to the 1-bit Vp data. It is to be appreciated that the operation is conducted as follows. By preparing four stages of the gain setting, two bits are assigned to the data. However, according to the size of the circuit configuration including the memory capacity, an appropriate design is to be selected. By the gain correction, the overall inclination of the characteristic between the electron emission and the emission voltage is corrected to equalize the characteristic in the high-luminance operation between the pixels. Therefore, as compared with the two-stage correction, it is natural that the four-stage correction can equalize more precisely the characteristic between the pixels. A delay circuit 60 shown in FIG. 2 compensates a delay difference with respect to video data to which Vc is added by the memory circuit 49.

Through the above processing, a video signal for which the low-luminance correction and the gain correction have been conducted can be outputted to a terminal 53, and the signal drives via the timing controller 13 and the driver circuits 2 to 6 the FED panel. Therefore, it is possible to display a video image without any variation in the luminance between the pixels in the low-luminance and high-luminance operations. That is, the variation in the emission start voltage is corrected by the low-luminance correction and the gain correction is also conducted. It is consequently possible to equalize the luminance characteristic between pixels in consideration of the low-luminance and high-luminance operations.

Figure 3:
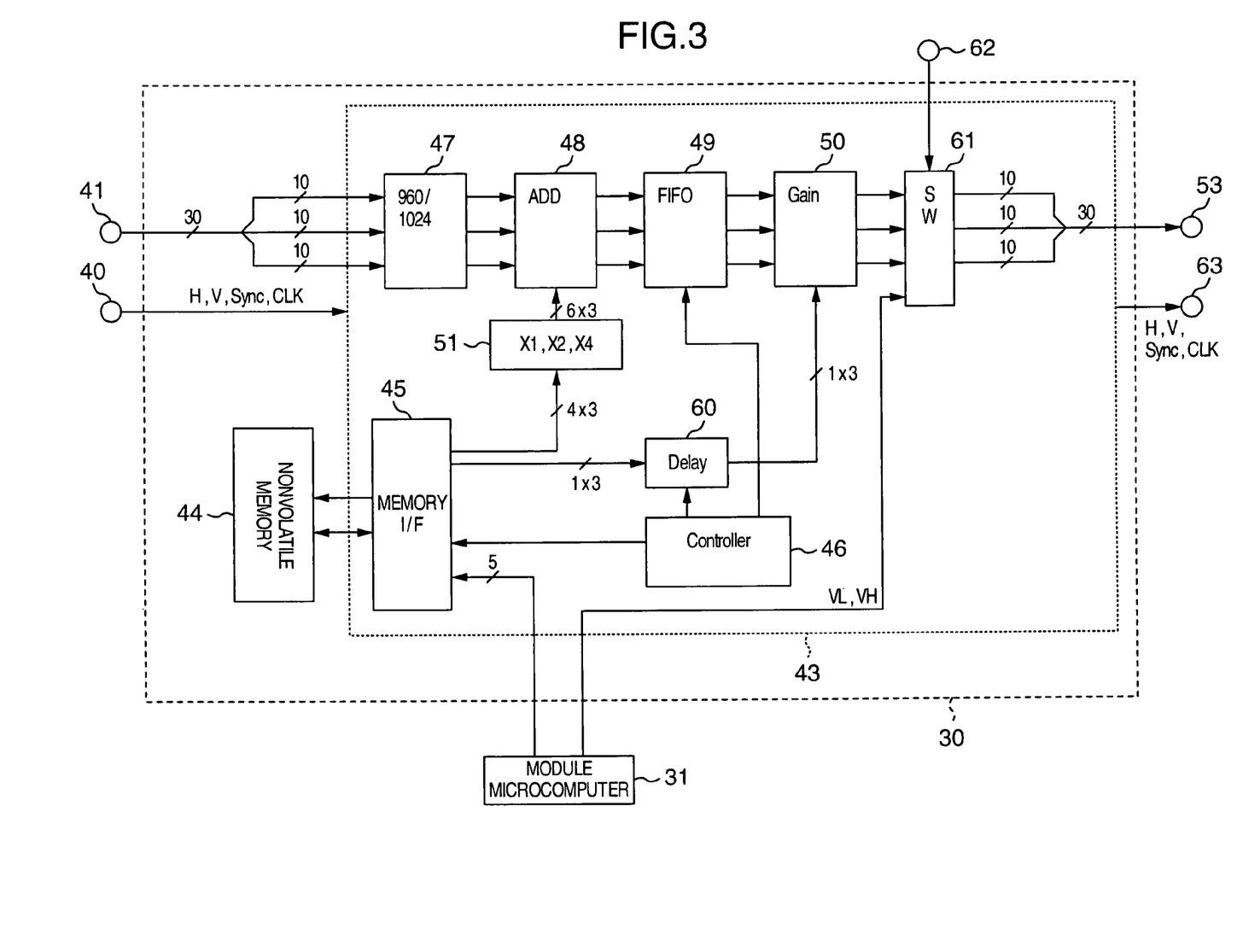
FIG. 3 is a block diagram showing another specific configuration of a constituent component 30 of the first embodiment.

FIG. 3 shows a configuration of another embodiment of the signal correcting circuit 30. FIG. 3 differs in constitution from FIG. 2 that the memory 42 and the data conversion circuit 64 are removed. First, the operation up to the operation to store data in the nonvolatile memory in the adjustment mode described above is the same as that of FIG. 2. In the embodiment described above, after data is kept in the high-speed memory 4 in the video display mode, the correction data is read from the memory 42 according to the video data. However, the data is read from a nonvolatile memory 44 in the present embodiment. This is possible by using as the nonvolatile memory a memory such as an SDRAM capable of conducting a high-speed read operation or a memory having a data bit width of 32 bits or 64 bits. When a memory having a data bit width of 32 bits or 64 bits is used, by collecting two or four pixels into one data item by the memory interface 45 to access the nonvolatile memory 44, the memory operation speed can be reduced. Therefore, the present embodiment can cope with a low-speed memory.

In the present embodiment, Vthd is obtained by providing a signal voltage (VL) with an amplitude corresponding to the low luminance for the FED panel 1 in the adjustment mode. The module microcomputer 31 computes a difference (Vcc) of Vs1–Vthd. That is, as compared with FIG. 2, the numeric value of the correction value Vcc is reversed (Vcc is small as Vthd is large). Therefore, the processing to compute 16–Vc of the data correction circuit can be removed.

In the correction circuits shown in FIGS. 2 and 3, when the input video signal is an N-bit quantized digital video signal (N is an integer equal to or more than one), it is favorable that the correction value for the low luminance is an M-bit digital value (M is an integer equal to or more than N/2). This is obtained in consideration of that the variation in the thickness of the insulator of the FED element described above is about 10% and hence the variation in the emission start voltage is at most about 0.2 V. That is, the idea is derived from that when the maximum value 4 V of the emission voltage in the characteristic between the electron emission and the emission voltage is assigned to eight bits, the system can cope with the correction value up to 0.25 V by assigning four bits to the correction value.

On the other hand, it is favorable that the gain correction value is two bits or less. It is commonly considered that no problem occurs if the variation between the pixels is three percent or less when an associated image is viewed by eyes. On the other hand, the variation in the luminance of the phosphor is 15% or less. Therefore, in a 4-stage gain correction, 3% can be assigned to the gain correction of one stage. When four stages are used, a maximum of 12% can be corrected. Therefore, even the variation in the luminance of the phosphor is the maximum of 15%, 12% can be reduced from the variation, and hence the result is within the variation range of 3%. Therefore, at most two bits are required to assign the 4-stage correction.

In the configuration examples of the signal correction circuit 30 of FIGS. 2 and 3 described above, the memory circuit 49 is used to adjust timing in the video signal processing, and hence may be a circuit such as a latch circuit to simply provide a 1-clock delay. In this case, the delay circuit 60 becomes a delay circuit corresponding to the delay quantity.

Figure 4:
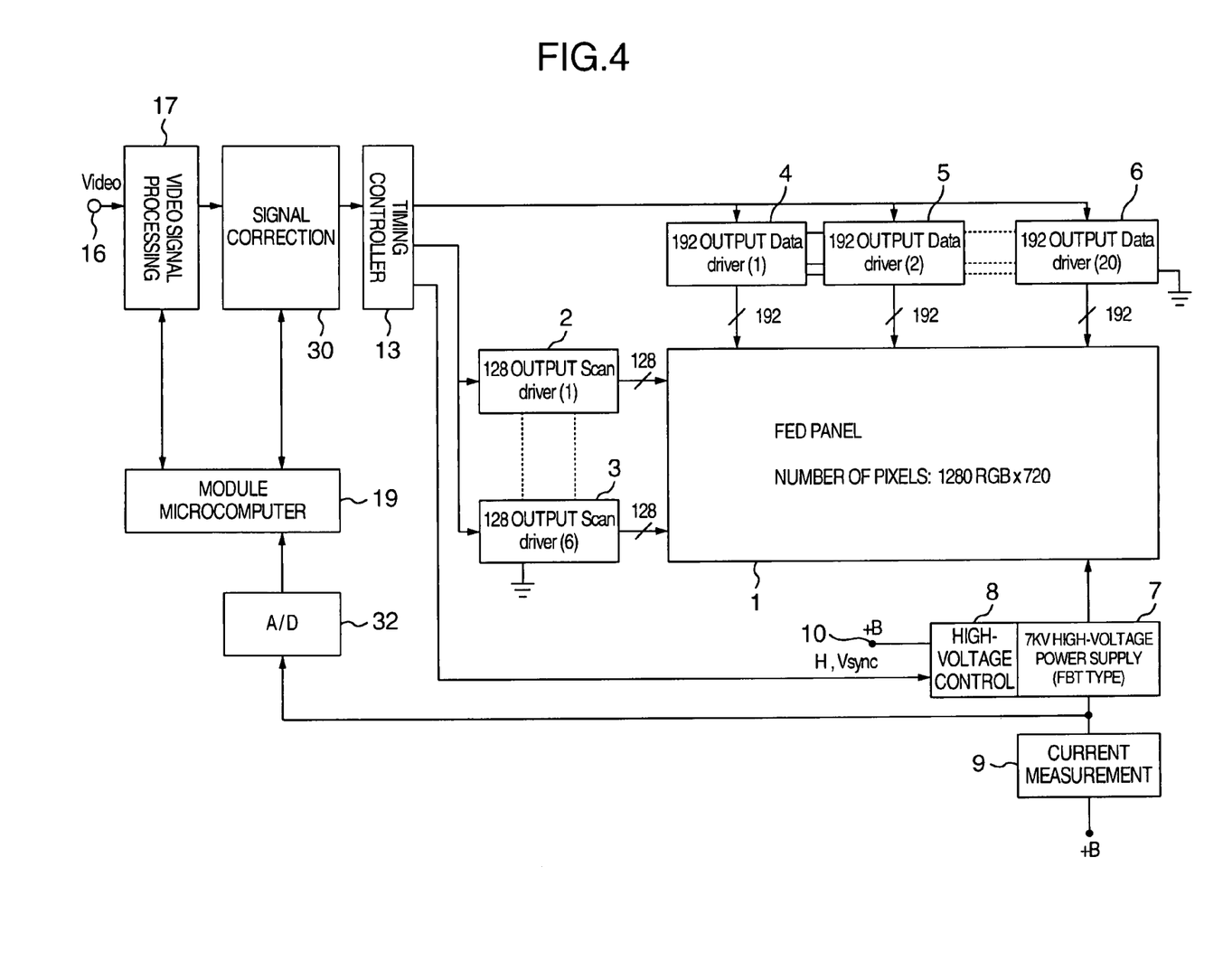
FIG. 4 is a block diagram showing a second embodiment of the present invention.

FIG. 4 shows a second embodiment of the present invention. The second embodiment differs from the first embodiment in that the system microcomputer 19 and the module microcomputer 31 are collected into one unit and the LVD-STx circuit 18 and the LVDSRx circuit 12 are removed from the configuration. The basic operation is the same in the first and second embodiments.

It then becomes possible to equalize the emission start voltage of each pixel through correction in the low-luminance emission and to equalize the inclination of the characteristic through the correction in the high-luminance emission in an FED element shown in FIG. 5, in which an emission start voltage in a characteristic between an electron emission quantity and an emission voltage is apt to undesirably varies because of variation in the thickness of the insulator 103 and brightness in the high luminance emission, that is, the inclination of the characteristic between an electron emission quantity and an emission voltage varies because of variation in the thickness of the phosphor 106.

In the description of FIG. 1, the signal correction circuit 30 is separated from the timing controller 13 and the LVDSRx 12. However, the functions of the circuits may be naturally incorporated in the signal correction circuit 30.

Description has been given of the luminance correction technique in an FED. However, when the variation in the characteristic regarding the electron emission quantity between the pixels is caused by a plurality of factors, it is to be appreciated even in a display panel other than a field emission display that the luminance can be equalized by using the correction value for each of the factors.

Similarly, although description has been given of a case in which two kinds of correction values are used, it is of course possible to use correction values of three kinds or more. In this case, it is favorable to use the correction values for the respective factors.

The picture quality can be improved in the display device by equalizing the characteristic in luminance between the pixels in consideration of low luminance and high luminance as described above.

According to one aspect of the present invention, the picture quality can be improved in the display device. According to another aspect of the present invention, the period of time to measure the correction quality of the luminance correction value can be reduced.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A display device, comprising,
a field emission display panel including a plurality of electron beam sources;
a memory which stores a first correction value for correcting a threshold voltage of each of the electron beam sources to emit light at a first luminance and a second correction value regarding light emission at a second luminance, the second luminance being more than the first luminance; and
a correcting circuit which corrects a video signal corresponding to each of the electron beam sources inputted thereto by using the first and second correction values read from the memory, wherein
an image is displayed on the field emission display panel using the video signal corrected by the correcting circuit.

2. A display device according to claim 1, wherein:
the video signal is a digital video signal quantized in a unit of N bits (N is an integer equal to or more than one); and
the first collection value is a digital value including M bits (M is an integer equal to or more than N/2).

3. A display device according to claim 2, wherein the second collection value includes at most two bits.

4. A display device according to claim 1, wherein the second collection value includes at most two bits.

5. A display device, comprising:
a high-voltage power supply circuit;
a field emission display panel to which a voltage is supplied from the high-voltage power supply circuit;
a first signal generator to generate a signal to emit light with first luminance from pixels of the field emission display panel;
a second signal generator to generate a signal to emit light with second luminance from pixels of the field emission display panel, the second luminance being more than the first luminance;
a current measuring circuit which detects a first current flowing from the high-voltage power supply circuit when the signal from the first signal generator is supplied and detecting a second current flowing from the high-voltage power supply circuit when the signal from the second signal generator is supplied;
a converter which converts a first current value detected by the current measuring circuit into first digital data and converts a second current value detected by the current measuring circuit into second digital data;
a first computing unit which compares the first digital data with a first reference value to output a first correction value and compares the second digital data with a second reference value to output a second correction value;
a memory which stores the first and second correction values;
a second computing unit to compute a video signal inputted thereto and the first correction value read from the memory; and
a third computing unit to compute an output from the second computing unit and the second correction value read from the memory, wherein
an output from the third computing unit is fed as an input signal to a data driver electrically connected to the field emission display panel and is displayed thereon.

6. A display device according to claim 5, wherein the second computing unit is an adder.

7. A display device according to claim 6, wherein:
the video signal is a digital video signal quantized in a unit of N bits (N is an integer equal to or more than one); and
the first collection value is a digital value including M bits (M is an integer equal to or more than N/2).

8. A display device according to claim 6, wherein the second collection value includes at most two bits.

9. A display device according to claim 5, wherein:
the video signal is a digital video signal quantized in a unit of N bits (N is an integer equal to or more than one); and
the first collection value is a digital value including M bits (M is an integer equal to or more than N/2).

10. A display device according to claim 5, wherein the second collection value includes at most two bits.

11. A display device, comprising;
a field emission panel including a plurality of electron beam sources;
a memory which stores both a first correction value corresponding to an emission start voltage of the electron beam sources for correcting variations in emission start voltages among the electron beam sources to emit light at a first luminance and a second correction value with a second luminance greater than the first luminance for correcting an inclination of an electron emission characteristic of the electron beam sources; and
a correcting circuit which corrects a video signal corresponding to each of the electron beam sources inputted thereto by using the first and second correction values read from the memory to correct variations in both the emission start voltage and the inclination of the electron emission characteristic, wherein
an image is displayed on the panel by using the signal corrected by the correcting circuit.

12. A display device according to claim 11, wherein the display pixels comprise at least an insulator layer and a phosphor layer arranged between electrodes.

13. A displaying method for a field emission display panel comprising a plurality of electron beam sources, the method comprising steps of:
storing into a memory a first correction value for correcting an emission start voltage of each of the electron beam sources to emit light at a first luminance and a second correction value regarding light emission at a second luminance, the second luminance being more than the first luminance; and
correcting a video signal corresponding to each of the electron beam sources inputted thereto by using the first and second correction values read from the memory, wherein
an image is displayed on the field emission display panel using the corrected video signal.

* * * * *